United States Patent [19]

White et al.

[11] 3,778,630

[45] Dec. 11, 1973

[54] MICROFILM SEARCHING SYSTEM

[76] Inventors: Eugene T. White, 40 New Mill Rd.; Joseph H. McEnroy, 10 Sandpiper Ct., both of Smithtown, N.Y. 11787

[22] Filed: Sept. 28, 1971

[21] Appl. No.: 184,513

[52] U.S. Cl. ............ 250/557, 235/92 V, 250/215, 353/26

[51] Int. Cl. ... G01n 21/30, G03b 23/12, G06f 7/38

[58] Field of Search .................. 353/25, 26; 355/41; 250/219 FR, 219 D, 215, 219 Q; 235/92 V

[56] References Cited

UNITED STATES PATENTS

| | | | |
|---|---|---|---|
| 3,435,243 | 3/1969 | Webb | 250/219 Q |
| 3,164,059 | 1/1965 | Turrentine, Jr. | 353/26 |
| 3,469,480 | 9/1969 | Nassenstein et al. | 250/219 FR |
| 3,594,581 | 7/1971 | Yamashita | 250/219 FR |
| 3,479,519 | 11/1969 | Keidel | 250/219 D |

*Primary Examiner*—James W. Lawrence
*Assistant Examiner*—T. N. Grigsby
*Attorney*—Myron Cohen et al.

[57] ABSTRACT

In an automatic microfilm searching system wherein a plurality of spaced images recorded on a film are displayed on the screen of a film reader at least one at a time, an apparatus and method for locating a particular one of the images for display by sensing the images displayed in accordance with at least one of a plurality of available distinct sensing formats and then counting the number of images so sensed. Each sensing format is defined by a distinct set of indicia on the film which are sensed and counted. The indicia of at least one available sensing format includes the images themselves, such as a preselected edge of each image.

15 Claims, 3 Drawing Figures

PATENTED DEC 11 1973 3,778,630

INVENTORS
EUGENE T. WHITE
JOSEPH J. McENROY
BY Hubbell, Cohen & Stiefel,
ATTORNEYS.

MICROFILM SEARCHING SYSTEM

BACKGROUND OF THE INVENTION

1. Field of the Invention

This invention relates to microfilm systems and, more particularly, to microfilm searching systems.

2. Description of the Prior Art

One type of information storage and retrieval systems used quite extensively these days are microfilm systems. Microfilm systems are very significant from a storage standpoint in that literally thousands of documents may be stored on each film with the size of each document on the film being of the order of 1mm. per inch of page of the document. Obviously, such reduction of size allows a substantial reduction in storage volume and simplifies mass handling of documents.

Special reading devices are needed, however, to display the documents in sufficiently enlarged size so that they may be detected and discerned by the human eye. Since thousands of documents are stored on each microfilm, hand searching of these documents is entirely impractical if not impossible from an efficiency standpoint. Consequently, coding and corresponding automatic searching techniques and devices have been developed.

In one microfilm coding and automatic searching system, which is used only on microfilm rolls as opposed to microfiche or the like, binary coded words are optically recorded in the film adjacent the documents. The binary words on the film may be sensed to indicate certain data concerning each of the documents. Although searching automatically and costly electronic circuity must be employed to correctly and quickly decode the words as the film is being scanned at high velocities, such as 100 feet per minute.

Automatic searching systems have been developed for rolls of microfilm which require less costly electronic hardware. In the most common of these systems, binary encoded words have been replaced by optically recorded marks or blips. As a document is being filmed, whether the camera be planetary or rotary, a small mark (blip) is photographically recorded on the film adjacent each document. Associated optical sensors detect the occurrence of each blip. The sensors generate a control signal each time a blip is detected, the control signal being used to advance the count of a display counter or the like. In this manner, each document is associated with a particular count thereby enabling appropriate indexes to be prepared. When a particular document is desired for display, its associated count is ascertained in the index and the film is advanced until the counter registers such count.

Although the use of blips rather than binary coded words reduces the costs of the reading equipment, it does not eliminate the need for costly and technically complex camera systems capable of recording the blip indicia on the film. Reference is had here primarily to the use of rotary camers since they provide the fastest and most efficient type of document filming.

A disadvantage of the latter-described system arises when more than one document is displayed concurrently on the screen of a microfilm reader at any one time. Such displaying of multiple documents shall be hereinafter referred to us as "multiplex mode," whereas the display of one document at a time is hereinafter referred to as "simplex mode."

More specifically, and by way of example, a roll of microfilm is often partitioned into two longitudinal channels with images of the front sides of documents being recorded on one channel and images on the back sides of documents being recorded on the other channel. This type of multiplex mode display is commonly referred to as a "duo-mode" display. In the past, only a single blip was recorded adjacent each row of two images displayed in duo-mode. This complicated searching since each blip necessarily indicated the presence of two images thereby requiring the operator to review whether each blip signified even or odd numbered documents.

Thus far, modern encoding techniques for microfilm rolls have been discussed which enable such rolls to be automatically searched. Due to the absence of encoded blips or other coded information on earily microfilm and present day fiche and the like, such films could not be indexed and automatically searched. As far as is known, there are no automatic searching systems presently in use capable of reading non-encoded film rolls and fiche.

SUMMARY OF THE INVENTION

The present invention is directed to an automatic searching system for microfilm systems which, while providing great accuracy, is completely independent of the type of film used (i.e., rolls, cartridges or microfiche) so that older nonblipped film, as well as microfiche, may be indexed and automatically searched. This also allows future microfilm rolls to be recorded without blips or other coding thereby eliminating costly blip-producing rotary cameras and the problems inherent in such cameras. The automatic searching system of this invention is also independent of the manner of displaying documents on a film reader (i.e., simplex or multiplex mode or any fiche format).

As used hereinafter, the term "images" is defined solely as the data photographed on the film, such as documents. Pre-recorded marks or blips or other coding are hereby expressly excluded from the above definition. Furthermore, the term "optical registration" is defined as an optical alignment between one object, such as an image or a path of images, and another object, such as an image sensing device.

Generally speaking, the present invention is directed to an apparatus and method for sensing the location of a particular one of a series of images recorded on a film in order to display such image on the screen of a film reader. The images are counted as the film is searched and the film may be stopped to display the image corresponding to a particular count. Images are sensed and counted in accordance with an available distinct sensing format defined by sensing each image itself as it passes a predetermined reference position.

More specifically, this invention is directed to an apparatus for locating a selected image from a plurality of spaced apart images on a film as the film is moved along a predetermined path, said apparatus comprising image responsive means disposed in optical registration with the path for responding to the images as they pass said image responsive means; and means for counting the number of images so sensed. The count is incremented each time one image is so sensed.

A preferred available sensing format of this invention is defined by sensing the change in contrast between images and the spaces between images, such as by photo-electrically sensing a preselected edge of each image. In this manner, any type of film, roll of fiche may be searched. There is no need to prerecord artificial indicia, such as blips, on the film by the use of complicated camera equipment.

Without having to rely solely on blip sensing, the difficulties of prior art multiplex mode searching systems have been eliminated regardless of whether the film actually contains blips or not. Considering duo-mode displays by way of example, the leading edge of the images on one channel and the trailing edge of the images on the other channel may be successively and alternatively sensed to advance the count separately for each image of each channel. Very great accuracy is obtained in this manner without the requirement of sensing prerecorded blips.

In a preferred embodiment of this invention, an apparatus for use in an automatic searching system comprises a plurality of photo-sensitive devices each being positioned in optical registration with a distinct set of indicia on the film to thereby define a corresponding plurality of distinct image sensing formats, each photosensitive device generating a control signal proportional in value to the intensity of light sensed, wherein a predetermined control signal is generated each time one of the associated distinct set of indicia is sensed; a numerical display counter for displaying a count representing the number of images sensed, the counter including count control means for incrementing the count in response to the predetermined control signals and means for selecting a particular sensing format to sense the location of the particular image by supplying to the count control means of the counter only those control signals generated by the photo-sensitive device defining the particular sensing format selected.

The present invention is also directed to a method in an automatic microfilm searching system for locating a particular image for display on the screen of a film reader. The method comprises the steps of sensing and counting each image as it passes a preselected reference position as the film is searched. The method is preferably accomplished by sensing contrast variations between images themselves and the spaces between images as the film is moved passed the reference position. Contrast variations may be sensed by photo-electrically sensing a preselected edge of each image as the images pass the reference position.

DESCRIPTION OF THE ILLUSTRATED EMBODIMENTS

Figures 1, 2:
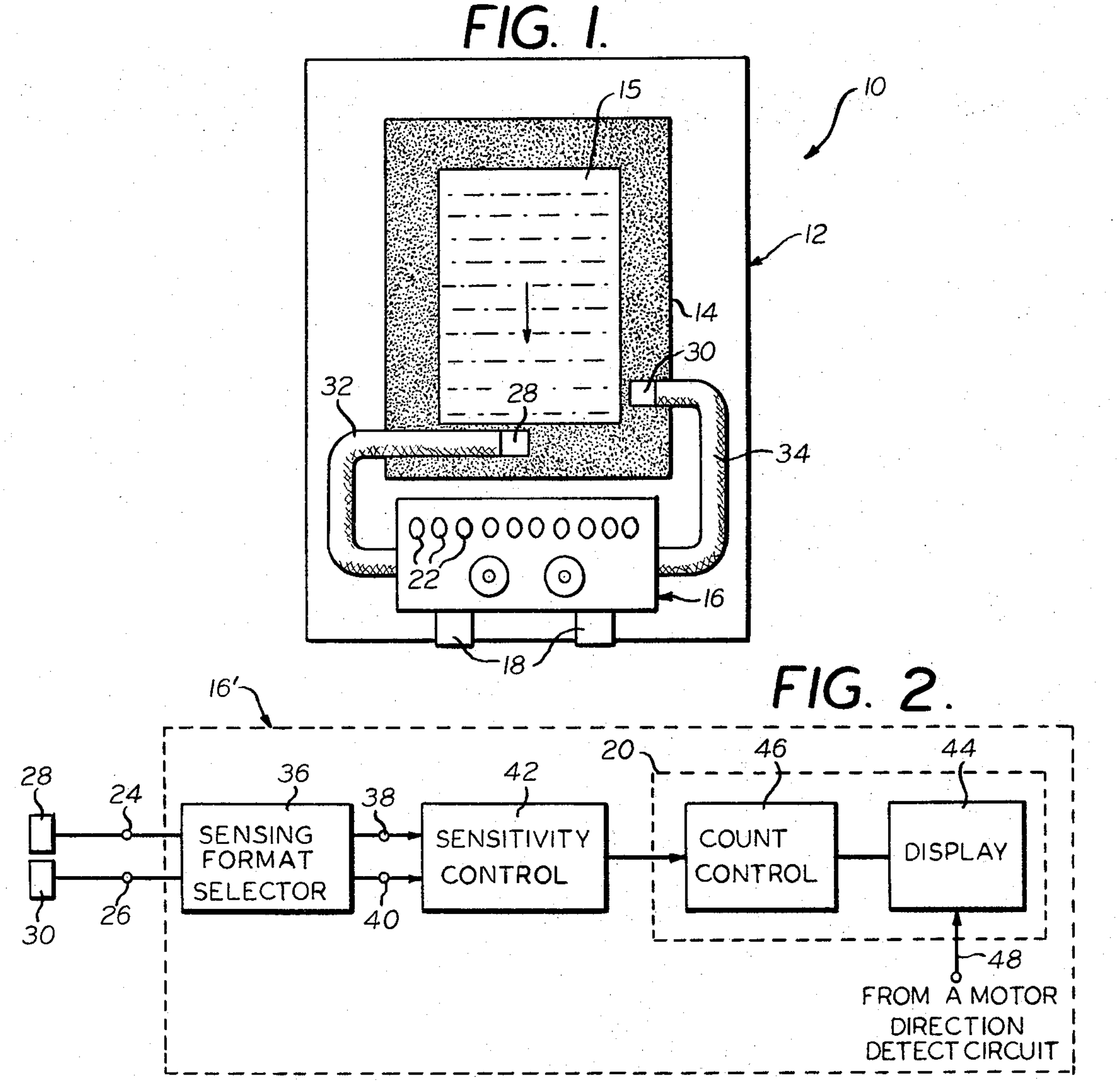
FIG. 1 is a front elevation view of a microfilm reader having an apparatus removably mounted thereon for counting the images displayed on the screen in accordance with at least one of a pair of distinct sensing formats, the images being displayed in simplex mode.
FIG. 2 is a schematic block diagram representation of the apparatus shown in FIG. 1.

Referring now to FIG. 1 in detail, a microfilm reading device (reader) 10 is shown having a housing 12 which includes a visual display screen 14 defined thereon. Images 15 recorded on microfilm are displayed on the screen in magnified form as the microfilm is advanced by appropriate motor hardware (not shown).

There are many types of film which a reader, such as reader 10, may be equipped to search. For example, the images recorded on microfilm strips, cards or fiche may be searched by moving them in a predetermined search pattern to display different images on screen 14 at least one at a time. If the images appear in simplex mode, a single image is displayed at a time as shown in FIG. 1; whereas in multiplex mode, a plurality of images are displayed at a time (See FIG. 3 for a duo-mode display).

For purposes of example, reader 10 is shown displaying an image recorded in simplex mode on a reel of film being searched. The film is searched by being transferred at a preselected speed between reels (no shown) so that the images are caused to move in a particular direction on screen 14, such as in the direction of the arrow shown. It should be noted, however, that the invention is not limited to searching simplex mode film reels, but contemplates the searching of any type of microtransparency having a plurality of spaced images recorded therein. Furthermore, it makes no difference in which direction the images are caused to move on the screen during searching.

In accordance with this invention, a unique image location apparatus (locator) 16 is removably attached to the housing of reader 10 at a location adjacent screen 14, such as beneath thereof, by means of a pair of mounting brackets 18. Locator 16 preferably includes a digital display counter 20 (FIG. 2) having a plurality of display lamps 22 for displaying a particular count thereon. Any indicating counter may be used, however.

Locator 16 has a pair of input terminals (inputs) 24 and 26 (FIG. 2). These inputs are adapted to receive input control signals which may be used to advance the count of counter 20. The manner of selecting only particular input control signals to control the count is more fully explained below.

A pair of photo-sensitive devices 28 and 30 are coupled respectively to inputs 24 and 26 by means of a pair of conductor cables 32 and 34, respectively. Preferably, cables 32 and 34 are flexible and inelastic so that when bent to a selected shape they hold that shape. This enables the cables to be bent to position devices 28 and 30 as desired, and to hold them in such positions. Of course, other positioning means may be employed.

Preferably, each photo-sensitive device is a photoelectric device, such as a photo-voltaic or photoresistive device. In the preferred embodiment, each photo-sensitive device is a photo-voltaic device which, for example, may be fabricated of cadium selenide to generate a dc control voltage having a level proportional to the intensity range of light detected.

In the preferred embodiment, as noted, each cable has an inner flexible, inelastic electrical conductor, such as copper, which is surrounded by conventional insulation. In this manner, each cable may be bent in order to position the associated photo-electric device at a desired location on screen 14 in optical registration with a distinct set of indicia on the film. The character of such indicia is more fully described below. Obviously, the inner conductor of each cable defines an electrical path between the photo-electric device and input on locator 16 it couples.

As an alternative to using cables, each photo-electric device may be permanently mounted within locator 16 with particular indicia on the film displayed on screen 14 being sensed by the photo-electric devices through a plurality of associated fiber-optic bundles (not shown). The free sensor end of each bundle may be positioned anywhere in the photo-optical path, such as at the film gate (not shown) within the reader 10, rather than on screen 14. In this context, particular indicia are sensed directly from the film itself.

Returning to the embodiment of FIGS. 1 and 2, each photo-electric device is positioned on screen 14 at a location to sense optically a distinct set of indicia on the film in order to advance the count pursuant to the sequence of display of the images. By sensing each distinct set of indicia, a corresponding distinct image sensing format is defined. For example, a distinct sensing format may be defined by sensing changes in contrast between images and the spaces between images on the film by photo-electrically sensing the leading or trailing edge of each image as the images are moved passed a sensor. This sensing format is more clearly described below. If the film is pre-blipped, another sensing format may be by sensing the blips recorded on the film adjacent each image.

As shown in FIG. 1 by way of example, photo-electric device 28 is positioned to sense the change in contrast from non-imaged spaces to images. This is done by photo-electrically sensing the leading edge of each image (which may be of a document or the like) and photo-electric device 30 is positioned to sense the occurrence of blips pre-recorded on the film adjacent each image. In the embodiment of FIG. 1, the film does not contain blips or other coding; thus, sensor 28 is selected for use in a manner more fully described below.

To again make it clear, what is sensed by photo-electric device 28 is the change in contrast, or light intensity, from non-imaged to imaged areas on the film. Photo-electric device 30 senses a change in contrast from non-blipped to blipped areas on the film (if pre-blipped). Photo-electric devices 28 and 30 achieve contrast variation sensing by photo-electrically sensing the leading edge of an image or blip, respectively.

What has been described thus far, therefore, is a plurality of distinct formats by which to sense the sequence in which images are displayed on screen 14 of reader 10 so that such sequence may be referenced by a displayed count. The sensing format defined by sensing the leading edge of each image does not require the use of pre-blipped film or the like, although obviously pre-blipped film may be used as well. The ability to index and automatically sense non-blipped film enables microfiche to be automatically searched which so far as we know, was not accomplished in the past. Even if the film to be read is pre-blipped, image sensing is preferably done by detecting changes in contrast between imaged and non-imaged areas, such as detecting an image edge, since the area of the image is larger in area and easier to detect than standard blips.

Referring now to FIG. 2 in greater detail, the manner of selecting a particular sensing format and the manner of registering sensed indicia in locator 16 for display on counter 20 are described. Generally speaking, locator 16 comprises a sensing format selector 36 having a pair of inputs, defined by inputs 24 and 26, and a pair of output terminals 38 and 40 both coupled to a sensitivity control circuit 42. Selector 36 may include any conventional controllable switching matrix (not shown) capable of selecting a particular one or more sensing formats by supplying to sensitivity control circuit 42 only those control signals (voltages) generated by each photo-electric device positioned to sense the set of indicia on the film defining such particular sensing formats.

For example, if images 15 are to be sensed and counted in accordance with the sensing format defined by sensing a change in contrast from the non-imaged space preceding each image to the image itself by photo-electrically sensing the leading edge of each image, then the switching matrix of selector 36 is set to pass to sensitivity control circuit 42 only those control signals generated by photo-electric device 28. Selector 36 may alternatively be set to pass control signals generated by photo-electric device 30, if blips were prerecorded on the film adjacent each image and it was desired to sense such blips. Furthermore, selector 36 may be set to pass the control signals generated by both photo-electric devices if such were desirable. Controllable switching circuits to perform the function of selector 36 are well known in the art this will not be further discussed.

Prior to describing sensitivity control circuit 42, it should be reiterated that each signal generated by photo-electric devices 28 and 30 is preferably a dc voltage having a level proportional to the intensity of light sensed. Thus, if device 28 is selected by selector 36 and the film is negative with documents appearing as dark images in a light background (non-imaged area), the voltage response at output 47 of circuit 46 will be low until the trailing edge of the document is sensed. The voltage level will then rise to a level proportional to the light intensity of the background, non-imaged space as it is moved past the sensor.

It is known that a negative image, i.e., black background with white writing thereon, appears gray to the photo-electric devices because of the fast speed at which the film is searched. The voltage level generated during the time the image is sensed is proportional to the shade of gray actually sensed. is when positive film is used with the leading edges of each image sensed, the voltage will rise from a level proportional to the shade of the non-imaged background to a level proportional to the shade of gray of the lighter images.

For purposes of describing the operation of device 28 and the sensing format defined thereby, positive film is shown in FIG. 1 with the leading edges of images 15 being sensed. In practice, however, since negative film is most often used in the industry, device 28 would be used to sense the trailing edges of images.

Sensitivity control circuit 42 is preferably defined by a conventional adjustable voltage threshold device having a built-in adjustable voltage threshold level. Signals generated by a selected photo-electric device and thus passed by selector circuit 36 must bear a predetermined relationship to this threshold level for it to be passed to display counter 20. Such relationship is described in more detail below. Threshold level is selected on the basis of the density of the film and images thereon as pre-determined by a separate densitometer or similar device (not shown), or, preferably, by a trial and error setting of sensitivity control 42 for each particular film.

Referring now to the manner of adjusting the threshold level, suppose, for purposes of example, that it is desired to locate a particular image recorded on a reel of positive film by sensing and counting the leading edge of each image. An appropriate threshold voltage level is then set at a level slightly less than the voltage level of the signal generated by device 28 when detecting the least dense image. In this instance, circuit 42 is designed to pass only those control signals generated by photo-electric device 28 having voltage levels exceeding the threshold level. It is thus assured that counter 20 will be triggered only by signals representative of the detection of the leading edge of each image.

Obviously, circuit 42 may be designed to pass only signals having a voltage level below a particular threshold level, such as when the leading edge of images are sensed on negative film or when the trailing edge of images are sensed on positive film. Circuit 42 would therefore present to counter 20 only those control signals passed by selector 46 which indicate the occurrence of one of a selected set of indicia for sensing. Adjustable threshold level circuits for performing the desired functions of circuit 36 are well known in the art.

With further reference to FIG. 2, counter 20 comprises a display portion 44 which may comprise a set of sequentially arranged display tubes 22 (FIG. 1), such as, for example, the well known "Nixie" display tubes manufactured by the Burroughs Corporation. The counting sequence is controlled by a count control circuit 46 in circuit between sensitivity control circuit 42 and display portion 44. Each time a signal is passed by sensitivity control circuit 42, it is supplied to count control 46 to trigger the counter either upwardly or downwardly depending upon the direction of progression of the film. There are many known techniques for accomplishing this result such as, for example, having a separate direction control signal on a line 48 to control the direction of count in response to a reader motor direction detector circuit (not shown).

It is to be noted that voltage regulation by circuit 42 is not the only way of controlling the sensitivity of the photo-electric devices. For instance, various light filters (not shown) could be disposed intermediate the display and the sensor to establish light intensity threshold levels, such filters being well known in the art.

The reason why each image is sensed must not be lost sight of. It is to display the numerical sequence and count of the images as they are displayed on the screen. This enables the progression of the film to be monitored so that a particular image located thereon, whose count is known from a prepared index or the like, may be found easily. Thus, the film is advanced until the pre-known count of the desired image is being approached, as shown on register 44. The reader motor (not shown) is then slowed and the particular image is located.

For example, the motor may be stopped automatically by employing the use of a keyboard servo system (not shown). Thus a number indicating a desired image is punched into a keyboard (not shown) which may generate a reference signal. As the film is counted, a signal indicative of the count may be generated and compared with the reference signal. When a match is detected, the motor may be automatically stopped. These servo systems are well known in the art.

Regarding the operation of the embodiment of FIGS. 1 and 2, an index may be provided listing each document photographed on a particular reel of microfilm. Each document is indexed according to the numerical sequence of appearance of its image during display when automatically searching the film in a pre-established search pattern. If, for example, it were desired to locate for display on screen 14 document number 2154 recorded on the film, the film would be advanced at high speed with the display of each image being detected, counted and displayed on counter 20.

Since the film shown in FIG. 1 does not contain blips or any other encoding material, and documents are recorded and displayed on screen 14 in simplex mode, then a sensing format defined by sensing an edge of each image (i.e., contrast variations between images and non-image areas) must be selected. This is done by positioning photo-electric device 28, for example, in optical registration with each image for detecting the leading edges thereof, as shown in FIG. 1.

An appropriate threshold level is then set on sensitivity control 42 consistent with the density of the images and non-imaged areas on the film. (The density will, of course, vary depending upon the specific type of film, e.g. silver). Thereafter, each time a change in contrast is detected from a dark to a light shade of gray (assuming black and white positive film) a control signal is generated by device 28 and is passed through selector 36 and circuit 42, it having a voltage level about the pre-set threshold level. This control signal causes count control circuit 46 to advance the count by one digit. When the desired image is approaching the screen for display, as indicated by the count approaching 2154, the reader motor is slowed and the image then precisely located by fine searching.

An important feature of this invention is the ability to use locator 16 with any type of microfilm reader. More specifically, since locator 16 is removable it can be positioned anywhere on or alongside of any reader available today so that the photo-sensitive devices may be positioned about the screen. In future microfilm readers, locator 16 may even be included as an integral element.

Figure 3:
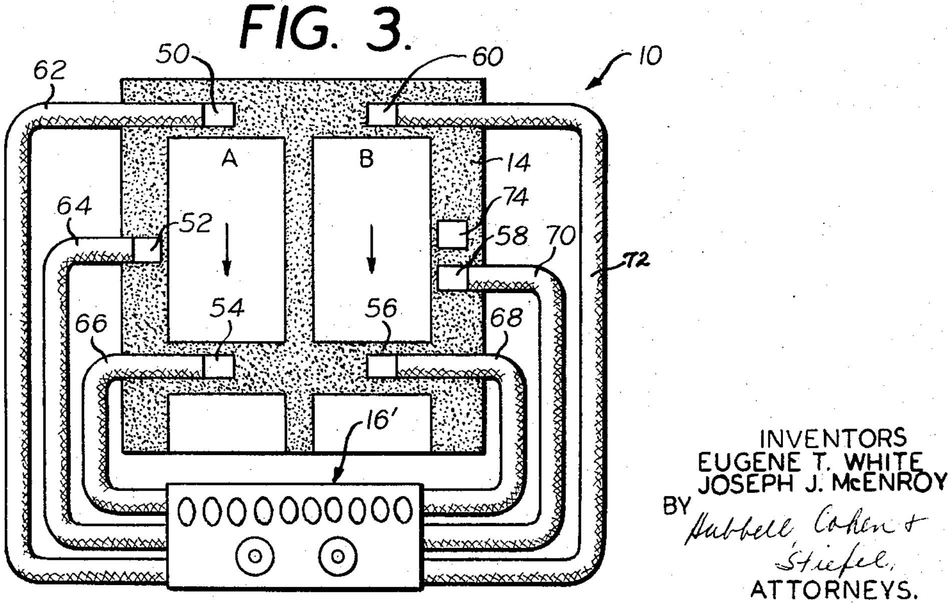
FIG. 3 is a front elevation view of another microfilm reader for displaying images in duo- mode on the screen as the film is searched, also having an apparatus removably mounted thereon for counting each image in accordance with any one or more of a plurality of distinct sensing formats.

Another image location device (locator) 16' of this invention is shown in FIG. 3. Device 16' is shown positioned to read a "duo-mode" image display on screen 14 of reader 10. The left channel of images is hereinafter referred to as channel A and the right channel as channel B. Device 16' may also be used to read simplex mode or duplex mode displays.

By "duplex mode" display, it is meant that a series of images are recorded on channel A as the film progresses between its reels during filming with no limit as to the number of channels. When the end of the film is reached, it is reversed and another series of images are recorded on channel B. The result is a film having two channels of images with the images of each channel being staggered relative to the images of the other channel. The channel B images may be wholly unrelated to those of channel A and may even vary in size relative to each other and the channel A images.

Referring now more particularly to FIG. 3, the film is shown searched in the direction of the indicated arrows. Locator 16' is similar to locator 16 and includes a sensing format selector, a sensitivity control circuit, a count control circuit, and a display portion (all not shown, but substantially identical to those of locator 16). Locator 16' differs, however, in that it includes six photo-sensitive devices 50–60, each of which is identical to devices 28 and 30 of locator 16 and is coupled to corresponding inputs of the sensing format selector circuit (not shown) preferably by means of flexible, inelastic conductive cable members 62–72, respectively. As with circuit 36 of locator 16, the selector circuit of locator 16' may be set to pass any one or more or all of the outputs from devices 50–60.

As pointed out previously, a problem manifested itself in prior art automatic searching systems for duo-mode image display. More specifically, only a single blip such as a blip 74, was recorded adjacent each row of images. In the prior art, a single blip was detected to indicate a pair of documents which complicated searching since the operator was required to review whether the blip signified even or odd numbered documents.

Now with locator 16' (or locator 16) one photo-electric device may be positioned to sense the leading edge of each channel A image, such as device 54 of locator 16', and one photo-electric device may be positioned to sense the trailing edge of each channel B image, such as device 60 of locator 16'. Then, the sensing format selector circuit of locator 16' (not shown) may be set to couple only the output signals generated by devices 54 and 60 to the sensitivity control circuit thereof (not shown). In this manner, as the film is advanced in the direction of the arrows, the first channel A image is counted, followed by the first channel B image, followed by the second channel A image, and so on, so that every image on the film may be separately counted.

There is no magic to the number of sensing formats made available for selection. It is felt, however, that at least one should be provided for each channel of images which does not require the sensing of pre-recorded blips or the like. In other words, simplex mode display should have as an available sensing format sensing contrast variations between images and non-imaged areas on the film, such as by sensing either the leading or trailing edge of each image. In duo-mode (or duplex mode), there should be at least two sensing formats available not requiring blip sensing. Of course, if blipped film may be used on occasion, it might be desirable to provide an additional sensing format to sense the occurrence of such blips.

In locator 16', all possible sensing formats for each channel are made available. For instance, device 50 is positioned to sense the trailing edge of each channel A image; device 52 is positioned to sense the leading edge of each channel B image; and device 58 is positioned to sense blips 74. Any one or more or all of the sensing formats defined by the position of these photo-electric devices may be selected by appropriately setting the sensing format selector circuit of locator 16'.

It should be noted that the above-described embodiments of this invention are preferably used to sense the occurrence of certain types of images, such as where the information contained on each image takes up the usual/normal amount of the total area of the image, and, additionally is dispersed about the image. This invention is thus specifically designed to provide quick and extremely accurate automatic searching of documents.

Although the various aspects of the invention have been described with respect to particular illustrated embodiments, the invention is not to be so limited. Rather, the invention is deemed to include obvious modifications and changes to the above-described embodiments. The precise scope of this invention is to be defined in the following claims.

What is claimed is:

1. In combination with a film reader for searching a film having a series of spaced images recorded thereon by displaying the images on a viewing screen at least one at a time, apparatus for locating a particular image for display by sensing the images displayed in accordance with at least one of a plurality of available sensing indicia formats, the apparatus comprising:

a. a plurality of photo-sensitive devices each being positioned in optical registration with a different distinct set of indicia on the film at a different peripheral location with respect to each of said images to thereby define a corresponding plurality of different distinct sensing indicia formats, each photo-sensitive device generating a control signal proportional in value to the intensity of light sensed, wherein a predetermined control signal is generated each time one of the associated distinct set of indicia is sensed;

b. means for counting the number of images sensed, said counting means including count control means for incrementing the count in response to the predetermined control signals; and c. means for changeably selecting a particular sensing format to sense the location of the particular image by supplying to the count control means of the counting means only those control signals generated by the photo-sensitive device defining the particular selected sensing format, whereby different peripheral locations with respect to each of said images may be sensed in accordance with the distinct set of indicia being utilized on the film being sensed.

2. The apparatus of claim 1, wherein one distinct set of indicia on the film includes a preselected edge of each image at a predetermined peripheral location with respect to said image.

3. The apparatus of claim 1, wherein the counting means further comprises means coupled between the selecting means and the count control means for controlling the sensitivity of the counting means to the control signals by passing to the count control means only the predetermined control signals.

4. The apparatus of claim 1, wherein each photo-sensitive device is a photo-voltaic device and wherein each predetermined control signal is a control voltage having a predetermined voltage level.

5. The apparatus of claim 1, wherein the counting means includes a numerical display counter.

6. The apparatus of claim 1, wherein the photo-sensitive devices are positioned in the photo-optical path of the film reader.

7. The apparatus of claim 6, wherein the photo-sensitive devices are positioned on the screen of the film reader.

8. The apparatus of claim 1 wherein one of said selectable defined distinct sensing indicas formats comprises disposing a portion of said photo-sensitive device plurality at one peripheral location with respect to each of said images for sensing the leading edge of each image and another one of said selectable defined distinct sensing indicia formats comprises disposing a different portion of said photo-sensitive device plurality at a different peripheral location for sensing the trailing edge of each image.

9. The apparatus of claim 8 wherein yet another one of said selectable defined distinct sensing indicia formats comprises disposing a still different portion of said photo-sensitive device plurality at a still different peripheral location for sensing the occurrence of blips prerecorded on the film adjacent each image.

10. The apparatus of claim 9 wherein the images are recorded and displayed side-by-side in duo-mode in a pair of channels and a portion of said photo-sensitive device plurality being disposed at one peripheral location with respect to each of said channels, said selecting means comprising means for changeably selecting the photo-sensitive devices associated with one channel as one sensing indicia format and selecting the photo-sensitive devices associated with the other channel as another sensing indicia format.

11. In combination with a film reader for searching a film having a series of spaced images recorded thereon by displaying the images on a viewing screen at least one at a time, a method for locating a particular image for display comprising the steps of:

a. sensing the presence of the images displayed in accordance with at least one of a plurality of different available sensing indicia formats wherein one available sensing format includes sensing a preselected edge of each image displayed on the screen at one peripheral location with respect to each image to sense one indicia, and another available sensing format includes sensing the presence of each said image at a different peripheral location with respect to said image to sense a different indicia;

b. selecting at least one of said available sensing indicia formats; and c. counting the number of images sensed in accordance with said selected indicia format.

12. The method of claim 11, wherein said one selected available sensing format comprises sensing the leading edge of each image at said one peripheral location.

13. The method of claim 12, wherein another selectable available sensing format comprises sensing the trailing edge of each image at said different peripheral location.

14. The method of claim 13, wherein yet another selectable available sensing format comprises sensing the occurrence of blips pre-recorded on the film adjacent each image at a still different peripheral location with respect to each said image.

15. The combination of claim 14, wherein the images are recorded and displayed in duo-mode, the method further comprising the step of selecting said one available sensing format for one channel of images and said other available sensing format for the other channel of images.

* * * * *

PO-1050
(5/69)

UNITED STATES PATENT OFFICE
CERTIFICATE OF CORRECTION

Patent No. 3,778,630 Dated December 11, 1973

Inventor(s) Eugene T. White, Joseph J. McEnroy

It is certified that error appears in the above-identified patent and that said Letters Patent are hereby corrected as shown below:

First page [76] Inventors: "Joseph H. McEnroy" should read -- Joseph J. McEnroy --; see title page of the specification.

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*